(12) United States Patent
Hwang et al.

(10) Patent No.: US 10,521,723 B2
(45) Date of Patent: Dec. 31, 2019

(54) ELECTRONIC APPARATUS, METHOD OF PROVIDING GUIDE AND NON-TRANSITORY COMPUTER READABLE RECORDING MEDIUM

(71) Applicant: SAMSUNG ELECTRONICS CO., LTD., Suwon-si (KR)

(72) Inventors: In-chul Hwang, Seoul (KR); Jae-deok Kim, Ansan-si (KR); Young-bin Shin, Suwon-si (KR); Jeong-su Seol, Seoul (KR); Jin-he Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 70 days.

(21) Appl. No.: 15/841,704

(22) Filed: Dec. 14, 2017

(65) Prior Publication Data
US 2018/0165581 A1 Jun. 14, 2018

Related U.S. Application Data

(63) Continuation-in-part of application No. 15/813,333, filed on Nov. 15, 2017, now abandoned.
(Continued)

(30) Foreign Application Priority Data

Dec. 22, 2016 (KR) .......................... 10-2016-0176733
Nov. 13, 2017 (KR) .......................... 10-2017-0150805

(51) Int. Cl.
*G10L 21/00* (2013.01)
*G06N 5/02* (2006.01)
(Continued)

(52) U.S. Cl.
CPC ............. *G06N 5/022* (2013.01); *G06F 3/167* (2013.01); *G06F 17/279* (2013.01); *G06N 3/008* (2013.01);
(Continued)

(58) Field of Classification Search
CPC ... G10L 15/22; G10L 2015/223; G10L 13/00; G10L 13/02; G10L 13/08; G10L 15/1815;
(Continued)

(56) References Cited

U.S. PATENT DOCUMENTS 6,154,526 A 11/2000 Dahlke et al.
6,415,257 B1 * 7/2002 Junqua ............... H04N 5/44543
348/E5.105
(Continued)

FOREIGN PATENT DOCUMENTS

JP 2000-338993 A 12/2000
JP 5243645 B2 7/2013
(Continued)

OTHER PUBLICATIONS

Hwang, et al., "Architecture for Automatic Generation of User Interaction Guides with Intelligent Assistant", Software R&D Center, Samsung Electronics, 4 pages total.
(Continued)

*Primary Examiner* — Huyen X Vo
(74) *Attorney, Agent, or Firm* — Sughrue Mion, PLLC

(57) ABSTRACT

The present disclosure relates to an artificial intelligence (AI) system that utilizes a machine learning algorithm such as deep learning and the like, and an application thereof. In particular, an electronic apparatus, a guide providing method thereof, and a non-transitory computer-readable recording medium are provided. An electronic apparatus includes an input interface configured to receive a user input, a display configured to display a guide, and a processor configured to
(Continued)

determine whether a task corresponding to the received user input is performable by the electronic apparatus, in response to determining that the task is performable, perform the task corresponding to the received user input, and in response to determining that the task is not performable, determine a candidate task related to the received user input and control the display to provide a guide for guiding the determined candidate task.

18 Claims, 12 Drawing Sheets

Related U.S. Application Data

(60) Provisional application No. 62/433,879, filed on Dec. 14, 2016.

(51) Int. Cl.
| | | |
|---|---|---|
| *G06N 3/08* | (2006.01) | |
| *G06F 17/27* | (2006.01) | |
| *G06F 3/16* | (2006.01) | |
| *G06N 3/00* | (2006.01) | |
| *G06N 3/04* | (2006.01) | |
| *G06N 5/04* | (2006.01) | |

(52) U.S. Cl.
CPC ............. *G06N 3/0445* (2013.01); *G06N 3/08* (2013.01); *G06N 3/084* (2013.01); *G06N 5/02* (2013.01); *G06N 5/04* (2013.01); *G06F 17/2785* (2013.01)

(58) Field of Classification Search
CPC ... G10L 15/1822; G10L 15/183; G10L 15/26; G10L 15/265; G10L 21/06; G06F 3/0481; G06F 3/0484; G06F 3/167; G06F 16/2228; G06F 16/245; G06F 1/3209; G06F 3/013; G06F 3/0488; G06F 3/147; G06F 9/448; G06F 9/5038; G06F 16/3329; G06F 16/3344; G06F 21/554; G06F 2221/2133; G06F 3/0482; G06F 3/04892; G06F 1/1204; G06F 9/451

USPC ........................................ 704/1–10, 230–277
See application file for complete search history.

(56) References Cited

U.S. PATENT DOCUMENTS

| | | |
|---|---|---|
| 8,374,872 B2 | 2/2013 | Kesireddy |
| 9,277,051 B2 | 3/2016 | Nasu et al. |
| 9,412,368 B2 | 8/2016 | Heo et al. |
| 9,865,252 B2 | 1/2018 | Bak et al. |
| 2004/0172256 A1 | 9/2004 | Yokoi et al. |
| 2010/0125458 A1 | 5/2010 | Franco et al. |
| 2013/0066634 A1 | 3/2013 | Soliman et al. |
| 2014/0181865 A1* | 6/2014 | Koganei .......... H04N 21/42203 725/38 |
| 2014/0272821 A1 | 9/2014 | Pitschel et al. |
| 2014/0278413 A1 | 9/2014 | Pitschel et al. |
| 2014/0288928 A1* | 9/2014 | Penn ....................... G10L 15/16 704/232 |
| 2015/0081711 A1* | 3/2015 | Harris ............... G06F 16/24522 707/737 |
| 2016/0155442 A1* | 6/2016 | Kannan ................... G06F 3/167 704/275 |
| 2016/0165049 A1 | 6/2016 | King |
| 2017/0239567 A1 | 8/2017 | Tamura et al. |

FOREIGN PATENT DOCUMENTS

| | | |
|---|---|---|
| KR | 10-2009-0000056 A | 1/2009 |
| KR | 10-2014-0004515 A | 1/2014 |
| KR | 10-2014-0098525 A | 8/2014 |
| KR | 10-2014-0111538 A | 9/2014 |
| KR | 10-1502004 B1 | 3/2015 |
| KR | 10-1614746 B1 | 5/2016 |
| WO | 2016/063564 A1 | 4/2016 |

OTHER PUBLICATIONS

International Search Report (PCT/ISA/210) dated Apr. 19, 2018 issued by the International Searching Authority in International Application No. PCT/KR2018/000336.

Written Opinion (PCT/ISA/237) dated Apr. 19, 2018 issued by the International Searching Authority in International Application No. PCT/KR2018/000336.

\* cited by examiner

ELECTRONIC APPARATUS, METHOD OF PROVIDING GUIDE AND NON-TRANSITORY COMPUTER READABLE RECORDING MEDIUM

CROSS-REFERENCE TO RELATED APPLICATIONS

This application is a continuation-in-part of U.S. application Ser. No. 15/813,333, filed Nov. 15, 2017, which claims priority from Korean Patent Application No. 10-2016-0176733, filed on Dec. 22, 2016 in the Korean Intellectual Property Office, Korean Patent Application No. 10-2017-0150805, filed on Nov. 13, 2017 in the Korean Intellectual Property Office, and U.S. Provisional Application No. 62/433,879, filed on Dec. 14, 2016 in the United States Patent and Trademark Office, the disclosures of which are incorporated herein by reference in their entireties.

BACKGROUND

1. Field

Apparatuses and methods consistent with exemplary embodiments relate to an electronic apparatus, a method of providing a guide thereof, and a non-transitory computer readable recording medium, and more particularly, to an electronic apparatus which provides a guide for performing a task through an intelligent assistant when a received user input is not interpreted in an executable form, a method of providing a guide thereof and a non-transitory computer readable recording medium.

In addition, the present disclosure relates to an artificial intelligence (AI) system that simulates a function such as recognition and determination of a human brain by using machine learning algorithm, and an application thereof.

2. Description of the Related Art

Recently, artificial intelligence systems that implement human intelligence have been used in various fields. The artificial intelligence system is a system that the machine learns, judges and becomes smart, unlike the existing rule-based smart system. Artificial intelligence systems are becoming more and more recognizable as users use them, and existing rule-based smart systems are increasingly being replaced by deep-learning-based artificial intelligence systems.

The artificial intelligence technology includes a machine learning (for example, deep learning) and element technologies that utilize machine learning.

Machine learning is an algorithm technology that classifies or learns the characteristics of input data by itself. Element technology is a technology that simulates functions such as recognition and judgment of human brain by using machine learning algorithms such as deep learning, which includes technical fields such as linguistic understanding, visual understanding, reasoning/prediction, knowledge representation, and motion control.

The various fields in which artificial intelligence technology is applied are as follows. Linguistic understanding is a technology for recognizing, applying/processing human language/characters and includes natural language processing, machine translation, dialogue system, query response, speech recognition/synthesis, and the like. Visual comprehension is a technique to recognize and process objects as human vision, including object recognition, object tracking, image search, human recognition, scene understanding, spatial understanding, and image enhancement. Inference prediction is a technique for judging and logically inferring and predicting information, including knowledge and probability-based reasoning, optimization prediction, preference base planning, and recommendation. Knowledge representation is a technology for automating human experience information into knowledge data, including knowledge building (data generation/classification) and knowledge management (data utilization). The motion control is a technique for controlling the autonomous travel of the vehicle and the motion of the robot, and includes motion control (navigation, collision, traveling), operation control (behavior control), and the like.

Meanwhile, with recent improvements in functions of mobile devices, speech recognition devices, home network hub devices, and the like, the number of users using these devices is increasing. In particular, such an electronic device provides an intelligent assistant or a virtual personal assistant (VPA) function for recognizing a user's voice and providing corresponding information or performing a task.

The existing intelligent assistant provided an error message if the user's voice could not be interpreted in a form that could perform a task. If an error message is provided, users who are unfamiliar with the intelligent assistant cannot know how to perform the action through the intelligent assistant by entering a user input. These users often give up using the intelligent assistant, resulting in a problem that the number of new users does not increase.

SUMMARY

Exemplary embodiments provide an electronic apparatus for determining a candidate task which can be performed based on a user input and providing a user input method for performing the determined candidate task when a user input is not performed in an operable form, a method of providing a guide thereof and a non-transitory computer readable recording medium.

According to an aspect of an exemplary embodiment, there is provided an electronic apparatus including an input interface configured to receive a user input; a display configured to display a guide; and a processor configured to: determine whether a task corresponding to the received user input is performable by the electronic apparatus; in response to determining that the task is performable, perform the task corresponding to the received user input; and in response to determining that the task is not performable, determine a candidate task related to the received user input and control the display to provide a guide for guiding the determined candidate task.

The processor may be further configured to obtain at least one from among an intention and a parameter by analyzing the received user input and determine whether there is a task that is performable based on the obtained at least one from among the intention and the parameter.

The processor may be further configured to determine whether the task is performable according to whether a word corresponding to a task execution command is included by analyzing the received user input.

The processor may be further configured to obtain at least one from among an intention and a parameter by analyzing the received user input, determine an entity corresponding to the obtained at least one from among the intention and the parameter, and search an information ontology for a candidate task based on the determined entity, wherein the information ontology may be a network representing a relationship between a task and an entity.

The processor may be further configured to remove part of the determined candidate task based on a purpose of a task and an attribute of a target entity for task execution.

The processor may be further configured to collect information regarding a use environment of the electronic apparatus, and determine a candidate task based on the collected information and the received user input.

The information regarding the use environment may include at least one from among information regarding an application being currently executed in the electronic apparatus, information regarding a task execution history, information regarding a user's position, and information regarding a current time.

The processor may be further configured to control the display to display a sentence for a user to utter to perform the determined candidate task.

According to an aspect of another exemplary embodiment, there is provided a guide providing method of an electronic apparatus, including: receiving a user input; determining whether a task corresponding to the received user input is performable; in response to determining that the task is performable by the electronic apparatus, performing the task corresponding to the received user input; and in response to determining that the task is not performable, determining a candidate task related to the received user and providing a guide for guiding the determined candidate task.

The determining may include: obtaining at least one from among an intention and a parameter by analyzing the received user input; and determining whether there is a task that is performable based on the obtained at least one from among the intention and the parameter.

The determining may include determining whether the task is performable according to whether a word corresponding to a task execution command is included by analyzing the received user input.

The determining may include: obtaining at least one from among an intention and a parameter by analyzing the received user input; determining an entity corresponding to the obtained at least one from among the intention and the parameter; and searching an information ontology for a candidate task based on the determined entity, wherein the information ontology may be a network representing a relationship between a task and an entity.

The method may include removing part of the determined candidate task based on a purpose of a task and an attribute of a target entity for task execution.

The determining may include: collecting information regarding a use environment of the electronic apparatus; and determining a candidate task based on the collected information and the received user input.

The information regarding the use environment may include at least one from among information regarding an application being currently executed in the electronic apparatus, information regarding a task execution history, information regarding a user's position, and information regarding a current time.

The providing a guide may include providing a sentence for a user to utter to perform the determined candidate task.

According to an aspect of another exemplary embodiment, there is provided a non-transitory computer readable recording medium including a program for executing a guide providing method of an electronic apparatus, wherein the guide providing method includes: receiving a user input; determining whether a task corresponding to the received user input is performable by the electronic apparatus; in response to determining that the task is performable, performing the task corresponding to the received user input; and in response to determining that the task is not performable, determining a candidate task related to the received user input and providing a guide for guiding the determined candidate task.

According to an aspect of an exemplary embodiment, there is provided an intelligence secretary electronic apparatus using a neural network model, the apparatus comprising: an input interface configured to receive a user input; a display; and a processor configured to determine whether or not an operation corresponding to the received user input through the input interface is performable, in response to determining that the operation is performable, to perform an operation corresponding to the received user input, in response to determining that the operation is not performable, to determine a candidate operation associated with the received user input, and to control the display to provide a guide that guides the determined candidate operation.

The user input may be a user voice. The processor may perform a voice recognition with respect to the user voice by using an artificial intelligence neural network.

The processor may acquire at least one from among an intention and a parameter by analyzing the received user input, determine an entity corresponding to the acquired intention and parameter, and retrieve a candidate operation in an information ontology based on the determined entity. The information ontology may be a network that indicates a relationship between an operation and an entity.

According to one or more exemplary embodiments, the electronic device can easily guide a user how to use an intelligent assistant. In addition, by providing the guide in the manner that the intelligent assistant operates, the electronic device can naturally provide the user experience with the intelligent assistant even to the user who uses the intelligent assistant for the first time.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Below, exemplary embodiments will be described in detail with reference to the accompanying drawings. In describing an exemplary embodiment, if it is determined that the detailed description of the known function or configuration may obscure the gist of the exemplary embodiments, the detailed description thereof may be omitted. The terms described below are defined in consideration of a function in an exemplary embodiment, and the definition may vary depending on users, operators, precedents, etc. Therefore, the terms used in the exemplary embodiments should be defined based on the contents of this specification in a comprehensive manner.

The term such as "first" and "second" used in various exemplary embodiments may modify various elements, but does not limit the corresponding elements. The terms are used only for the purpose of distinguishing one element from another. For example, a first element may be named a second element, and similarly, a second element may be named a first element. The term and/or includes any combination or one of a plurality of related items recited.

The terms used herein are intended to explain an exemplary embodiment, and not to limit the scope of the present disclosure. A singular expression includes a plural expression, unless otherwise specified. The terms "include" or "comprise" are used the description to indicate that there are features, numbers, operations, elements, parts or combination thereof, and they should not exclude the possibilities of combination or addition of one or more features, numbers, operations, elements, parts or combination thereof.

According to an exemplary embodiment, 'module' or 'unit' may perform at least one function or operation, and may be implemented to be hardware, software or combination of hardware and software. In addition, a plurality of 'modules' or 'units' may be integrated into at least one module and may be realized as at least one processor in an integrated manner except for 'modules' or 'units' that should be realized in specific hardware.

Below, an exemplary embodiment will be described in detail with reference to the attached drawings.

Figure 1:
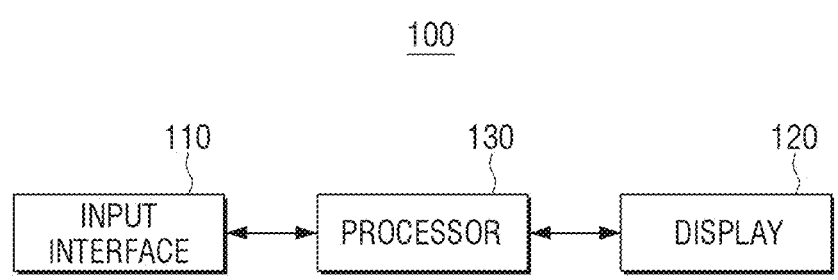
FIG. 1 is a block diagram illustrating a configuration of an electronic apparatus according to an exemplary embodiment.

FIG. 1 is a block diagram illustrating configuration of an electronic apparatus 100 according to an exemplary embodiment. As illustrated in FIG. 1, the electronic apparatus 100 may provide an intelligent assistant service alone. In another example, the electronic apparatus 100 may provide an intelligent assistant service to a user in association with a server 200 (see FIG. 5).

The term "an intelligent assistant" used herein refers to a software application that combines artificial intelligence technology and speech recognition technology to understand a user's language and perform the instructions desired by the user. For example, the intelligent assistant may perform an artificial intelligent function such as machine learning, speech recognition, context awareness including deep learning. The intelligent assistant may learn the customs or patterns of users and provide personalized services for the individuals. Examples of the intelligent assistant may include S voice and Bixby. The intelligent assistant may also be referred to as an artificial personal assistant, an interactive agent, etc.

The electronic apparatus 100 may be a mobile device such as a smart phone or a tablet personal computer (PC), but it is merely an example. The electronic apparatus 100 may be implemented as various apparatuses which can recognized a user input such as a user voice and perform a corresponding operation, such as a voice recognition device, a wearable device, a hub of a home network, an electronic frame, a humanoid robot, an audio device, a navigation device, a smart TV, and the like.

Referring to FIG. 1, the electronic apparatus 100 may include an input interface 110, a display 1120 and a processor 130.

The input interface 110 may receive a user input. For example, the input interface 110 may receive a voice input, a text input, an image input, and the like.

The display 120 may display various image contents, information, UI, etc. provided by the electronic apparatus 100. For example, the display 120 may display a guide user interface (UI) for guiding a sentence for a user to utter to perform a task through an intelligent assistant function.

The processor 130 may recognize a received user input. For example, when a user input is a voice input, the processor 130 may perform preprocessing on the input user voice before performing a voice recognition function. For example, the preprocessing may include the operations of removing noise and obtaining features. The preprocessing may be performed in the processor 130, or in other elements which are separately provided.

The processor 130 may determine whether the corresponding task can be performed based on the user input recognition result. Specifically, the processor 130 may obtain intention or a parameter by analyzing the user input. Subsequently, the processor 130 may determine whether it is possible to perform the task based on at least one of the obtained intention and parameter. The processor 130 may also determine whether it is possible to perform the task based on whether a word corresponding to a task execution command is included.

For example, if a word corresponding to task execution, such as 'call' or 'text', is recognized based on the analysis on the received user input, the processor 130 may perform the corresponding task such as the task of making a call or transmitting a text message.

On the other hand, if only a word such as 'tomorrow' is recognized based on the analysis on the received user input, the processor 130 may not know which task should be performed based on the recognized word only. As such, when there is no system command corresponding to the interpretation of the user input, or when an answer cannot be determined easily, the processor 130 may determine that it is impossible to perform the task.

The conventional intelligent assistant function provides an error message such as "Sorry, I don't understand" when it is impossible to perform the task. However, the processor 130 may determine a candidate task related to the received user input when it is determine that it is impossible to perform the task. The processor 130 may control the display 120 to provide a guide guiding the determined candidate task.

For example, the processor 130 may obtain a parameter from the received user input. The processor 130 may determine an entity corresponding to the obtained parameter. Based on the determined entity, the processor 130 may search an information ontology for a candidate task. The information ontology refers to connection of relationship between a task and an entity provided in a network form. When the information ontology is used, it is possible to find an optimum system task or response and thus, the information ontology may be referred to as a task network.

As another example, the processor 130 may determine a candidate task using not only the received user input but also information regarding a use environment of the electronic apparatus 100. For example, the information regarding the use environment may include information regarding an application which is currently executed, information regarding a task execution history, information regarding a user's position, information regarding a current time, etc.

The processor 130 may filter some of the determined candidate task based on the purpose of task execution and the attribute of a target entity for task execution. For example, suppose that the determined candidate task is 'copy a photo', 'make an album', and 'delete a photo', and the target entity for task execution is a blurred photo. From the attribute 'Blur' of the target entity for task execution, the processor 130 may determine that the intention of the user is not to perform the task of 'copy a photo' and 'make an album'. The processor 130 may filter and remove 'copy a photo' and 'make an album' from the candidate task.

The processor 130 may provide a guide for the finally determined candidate task. For example, the processor 130 may control the display 120 to display a sentence for the user to utter to perform the finally determined candidate task. Through the above, the user may learn how to perform the task through the intelligent assistant service naturally.

Figure 2:
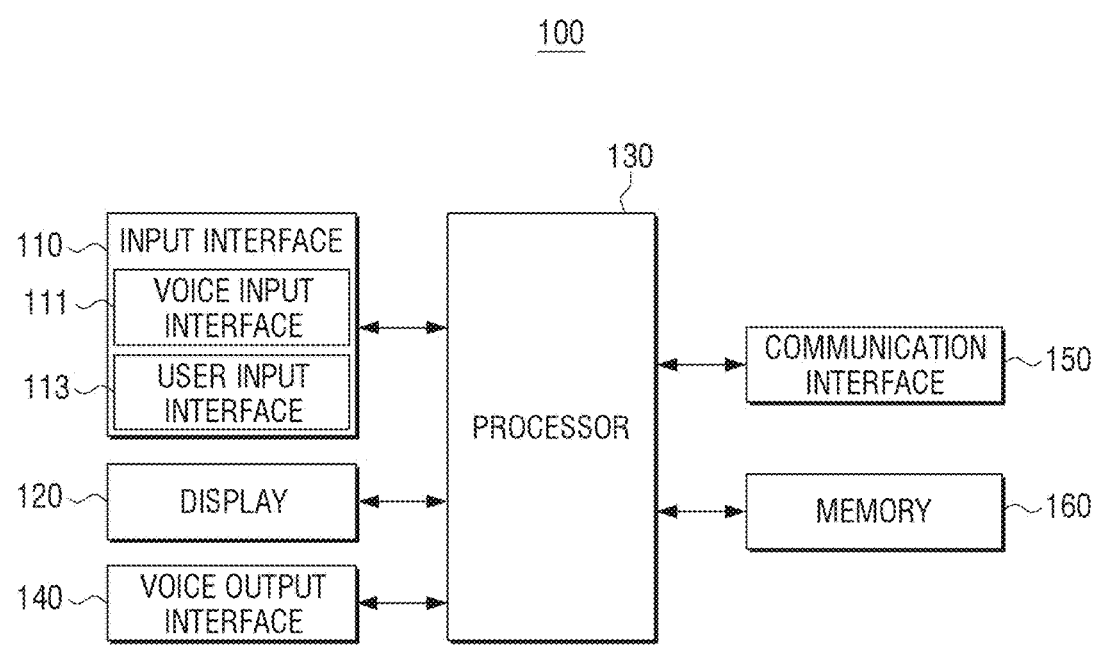
FIG. 2 is a block diagram illustrating a configuration of an electronic apparatus in detail according to an exemplary embodiment.

FIG. 2 is a block diagram illustrating a configuration of the electronic apparatus 100 in detail according to an exemplary embodiment. Referring to FIG. 2, the electronic apparatus 100 may include the input interface 110, the display 120, the processor, a voice output unit 140 (e.g., voice output interface), a communication interface 150 and a memory 160. In addition to the elements illustrated in an exemplary embodiment of FIG. 2, the electronic apparatus may include various elements such as an image receiver, an image processor, a power unit, etc. In addition, the electronic apparatus 100 is not necessarily implemented to include all of the elements illustrated in FIG. 2.

The input interface 110 may receive a user input. For example, the input interface 110 may include a voice input interface 111 for receiving a user voice and a user input interface 113 for receiving a user command except a voice input.

The voice input interface 111 may be implemented by one or more microphones to receive a user voice uttered by the user. For example, the voice input interface 111 may be integrally implemented with the upper side, the front direction, and the side direction of the electronic apparatus 100, or may be provided separately and connected to the electronic apparatus 100 through a wired or wireless interface.

In addition, the voice input interface 111 may include a plurality of voice input interfaces and generate a plurality of voice signals by receiving voice at different positions. Using a plurality of voice signals, the electronic apparatus 100 may generate a single enhanced voice signal in a preprocessing process prior to performing a voice recognition function.

In addition, the voice input interface 111 may include various acoustic filters for removing noise.

The user input interface 113 may receive various user commands to control the electronic apparatus 100 except a voice input. For example, the user input interface 113 may receive a user command to select one of a plurality of candidate tasks displayed on a guide UI. The user input interface 113 may be implemented as a button, a motion recognition device, a touch pad, a keyboard and the like. If the user input interface 113 is implemented as a touch pad, it may be implemented in the form of a touch screen having a mutual layer structure in combination with the display 120. The touch screen may detect a touch input position, area and pressure of the touch input.

The display 120 displays various guides, image contents, information, UI, etc. provided by the electronic apparatus 100. The display 120 may be implemented as a liquid crystal display (LCD), an organic light emitting display (OLED), or a plasma display panel (PDP), etc., and display various screens which can be provided through the electronic apparatus 100.

The display 120 may display an image corresponding to a voice recognition result of the processor 130. For example, the display 120 may display a user's voice recognition result as text. In addition, the display 120 may display a guide UI for guiding a candidate task. For example, the display 120 may display a guide UI for displaying a sentence for the user to utter to perform a candidate task which is determined based on the user voice that has been recognized so for.

The voice output unit 140 may output a voice. For example, the voice output unit 140 may output not only various audio data but also notification sounds or voice messages. The electronic apparatus 100 according to an exemplary embodiment may include the voice output unit 140 as one of output units to provide an interactive intelligent assistant function. By outputting a natural language-processed voice message through the voice output unit 140, the electronic apparatus 100 may provide the user with a user experience that seems to talk to the electronic apparatus 100. The voice output unit 140 may embedded in the electronic apparatus 100 or may be implemented in the form of an output port such as a jack or the like.

The communication interface 150 may be a transceiver and may communicate with an external apparatus. For example, the external apparatus may be implemented as a server 200, a cloud storage, a network, etc. The communication interface 150 may transmit a voice recognition result to an external apparatus and receive corresponding information from the external apparatus. The communication interface 150 may receive a language model for voice recognition and an information ontology for determining a task from an external apparatus.

For example, the communication interface 150 may transmit a voice recognition result to the server 200 and receive a guide for guiding a control signal to perform a corresponding task in the server 200 or a candidate task.

For this purpose, the communication interface 150 may include various communication modules such as a near field wireless communication module, a wireless communication module, etc. Here, the near field wireless communication module refers to a module for performing communication with an external apparatus which is located nearby according to a near field wireless communication method such as Bluetooth, Zigbee, etc. The wireless communication module is a module which performs communication by being connected to an external network according to a wireless communication protocol, such as WiFi, WiFi direct, IEEE, and the like. Additionally, the wireless communication module may further include a mobile communication module which performs communication by accessing a mobile communication network according to various mobile communication standards such as a 3rd generation (3G), a 3rd generation partnership project (3GPP), a long term evolution (LTE), a LTE Advanced (LTE-A), and the like.

The memory 160 stores various modules, software and data to drive the electronic apparatus 100. For example, the memory 160 may store Acoustic Model (AM) and Language Model (LM) which can be used to recognize a user voice. In addition, the memory 160 may store an information ontology (or a task network) to determine a candidate task based on a user input. The memory 160 may store a model for Natural Language Generation (NLG).

The storage 160 is a storage medium which stores various programs to operate the electronic apparatus 100, and may be implemented as a flash memory, a hard disk drive (HDD), a Solid State Drive (SSD), and the like. For example, the storage 160 may include a read only memory (ROM) which stores programs to operate the electronic apparatus 100 and a random access memory (RAM) which temporarily stores data according to operation execution of the electronic apparatus 100.

The memory 160 may store programs, data, and the like, for forming various screens to be displayed on the display 120. In addition, the memory 160 may store programs, applications and data to perform a specific service.

The memory 160 may pre-store various response messages corresponding to a user voice as voice or data. The electronic apparatus 100 may read at least one of voice and text data corresponding to the received user voice (e.g., a user control command) from the memory 160 and output the same to the display 120 or the voice output unit 140. Through the above, the electronic apparatus 100 may provide the user with a message which is simple or frequently used without going through a natural language generation model.

The processor 130 may control the above-described elements of the electronic apparatus 100. For example, the processor 130 may control the display 120 to provide a guide guiding the determined candidate task.

The processor 130 may be implemented as a single central processing unit (CPU) to perform a voice recognition task, a language understanding task, a dialog management task, a candidate task search task, a filtering task, a response generation task and the like, or may implemented as a plurality of processors and an IP to a specific function. The processor 130 may perform voice recognition based on a conventional hidden Markov Model (HMM) or may perform deep learning-based voice recognition such as a Deep Neural Network (DNN).

In addition, the processor 130 may use big data and history data for each user to recognize voice and determine a candidate task. Through the above, the processor 130 may personalize the voice recognition model and the information ontology while using the voice recognition model and information ontology learned with the big data.

The processor 130 may obtain intention or a parameter by analyzing the received user input. Based on the obtained intention and parameter, the processor 130 may determine whether there is a corresponding system command. If there is a corresponding system command, the processor 130 may perform a task corresponding to the user input.

On the other hand, if there is no corresponding system command, the processor 130 may determine an entity corresponding the obtained intention or parameter. Subsequently, the processor 130 may determine all candidate tasks or responses related to the entity using information ontology. In addition, the processor 130 may filter some candidate tasks using a semantic relation between entities and attributes.

The processor 130 may generate a guide message regarding the determined candidate task or response. By generating a guide message in a natural language generation method, the processor 130 may output a user command to be input in order to perform the determined candidate task as an interactive message.

Below, the task of the processor 130 will be described again in greater detail with reference to the drawings.

Figure 3:
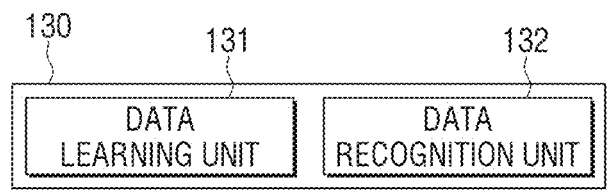
FIG. 3 is a block diagram illustrating a processor according to an exemplary embodiment.

FIG. 3 is a block diagram illustrating the processor 130 according to an exemplary embodiment. Referring to FIG. 3, the processor 130 according to an exemplary embodiment may include a data learning unit 131 and a data recognition unit 132.

The data learning unit 131 may learn the criteria for voice recognition, language understanding, a user's utterance intention determination, and candidate task determination. The processor 130 may determine the user's utterance intention by analyzing the user voice which is input according to the learned criteria. The processor 130 may determine a candidate task that is consistent with the utterance intention, and generate a guide message for guiding the determined candidate task. The data learning unit 131 may determine what data to use in order to recognize a user voice. The data learning unit 131 may determine what data to use in order to understand the recognized user voice and determine the intention of the user's utterance. The data learning unit 131 may acquire data to be used for learning, and learn the criteria for voice recognition and the user's utterance intention determination by the applying a data recognition model which will be described later to the acquired data.

The data recognition unit 132 may recognize circumstances from predetermined data using the learned data recognition model. The data recognition unit 132 may acquire predetermined data according to predetermined criteria by learning, and use the data recognition model with the acquired data as an input value. For example, the data recognition unit 132 may recognize the input user voice using the learned acoustic model and the language model. In addition, based on the recognized user voice and the information ontology, the data recognition unit 132 may determine what action to perform from the user's utterance. The data recognition unit 132 may update the data recognition model by using the data acquired as a result of the voice recognition of each user, the utterance intention and the candidate task determination as the input value again. As such, the data recognition unit 132 may use big data and history data for each user to recognize a voice and determine an executable candidate task. The processor 130 may use the learned information ontology as big data and at the same time, personalize the information ontology.

At least one of the data learning unit 131 and the data recognition unit 132 may be manufactured in the form of one or a plurality of hardware chips and mounted on the electronic apparatus 100. For example, at least one of the data learning unit 131 and the data recognition unit 132 may be manufactured in the form of a chip exclusively used for hardware for artificial intelligence (AI), in the form of the existing universal processor (for example, CPU or application processor), or as part of IP for a specific function to be mounted on the above-described various electronic apparatuses 100.

According to an exemplary embodiment of FIG. 4, both the data learning unit 131 and the data recognition unit 132 are mounted on the electronic apparatus 100, but they may be mounted on a separate device, respectively. For example, one of the data learning unit 131 and the data recognition unit 132 may be included in the electronic apparatus 100, and the other one may be included in the server 200. In addition, the data learning unit 131 and the data recognition unit 132 may be connected to each other via wire or wirelessly to provide model information established by the data learning unit 131 to the data recognition unit 132, and the data input to the data recognition unit 132 may be provided to the data learning unit 131 as addition learning data.

At least one of the data learning unit 131 and the data recognition unit 132 may be implemented as a software module. If at least one of the data learning unit 131 and the data recognition unit 132 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

Figure 4A:
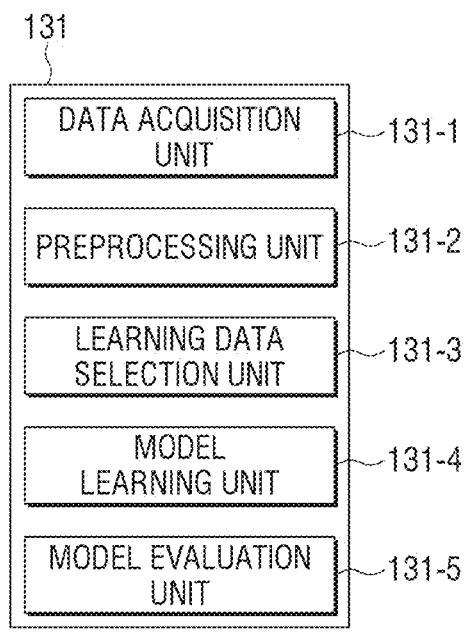
FIG. 4A is a block diagram illustrating a data learning unit according to an exemplary embodiment.

FIG. 4A is a block diagram illustrating a data learning unit 131 according to an exemplary embodiment. Referring to FIG. 4A, the data learning unit 131 according to an exemplary embodiment may include a data acquisition unit 131-1, a preprocessing unit 131-2, a learning data selection unit 131-3, a model learning unit 131-4, and a model evaluation unit 131-5.

The data acquisition unit 131-1 may acquire data to determine circumstances. For example, the data acquisition unit 131-1 may acquire voice data by converting a user voice signal input through the input interface 110 into a digital signal. The data acquisition unit 131-1 may receive learning audio data from the server 200 or a network such as the Internet.

The preprocessing unit 131-2 may pre-process obtained data so that the obtained data can be used for learning to determine circumstances. The preprocessing unit 131-2 may pre-process obtained data so that the obtained data can be used for learning for determining circumstances.

For example, the preprocessing unit 131-2 may acquire a section to be recognized with respect to an input user voice. The preprocessing unit 131-2 may generate voice data by removing noise, acquiring features, etc.

As another example, the preprocessing unit 131-2 may intensify some frequency elements by analyzing the frequency elements of the input user voice, and generate voice data to be suitable for voice recognition in a manner of suppressing the remaining frequency elements.

The learning data selection unit 131-3 may select data required for learning from among the preprocessed data. The selected data may be provided to the model learning unit 131-4. The learning data selection unit 131-3 may select data required for learning from among the preprocessed data according to predetermined criteria for determining circumstances. In addition, the learning data selection unit 131-3 may select data according to predetermined criteria by learning of the model learning unit 131-4 which will be described later.

For example, at the beginning of learning, the learning data selection unit 131-3 may remove voice data having high similarity among the preprocessed voice data. In other words, for the initial learning, the learning data selection unit 131-3 may select voice data having low similarity to learn criteria which is easy to distinguish.

As another example, the learning data selection unit 131-3 may select only voice data which is uttered in a specific language. As utterance characteristics vary depending on languages, the learning data selection unit 131-3 may allow the model learning unit 131-4 to learn criteria suitable for the selected specific language by selecting a set of voice data which is uttered in the specific language.

On the contrary, the learning data selection unit 131-3 may select voice data where characteristics of each language are reflected. Through the above, the model learning unit 131-4 may learn criteria for which criteria the voice data corresponds to.

For example, the learning data selection unit 131-3 may allow the model learning unit 131-4 to learn criteria for speaker dependent recognition or speaker adoption recognition by selecting only voice data of a specific user.

The data learning selection unit 131-3 may select preprocessed voice data which commonly satisfies one of predetermined criteria by learning. Through the above, the model learning unit 131-4 may learn criteria different from the criteria which are already learned.

The model learning unit 131-4 may learn criteria for determining circumstances based on the learning data. In addition, the model learning unit 131-4 may learn criteria for which learning data to use in order to determine circumstances.

For example, the model learning unit 131-4 may learn the physical characteristics that distinguish phonemes, syllables, vowels, etc. by comparing a plurality of voice data. Through the above, the model learning unit 131-4 may establish an acoustic model (AM) for classifying sound units such as phonemes. In addition, the model learning unit 131-4 may learn word or lexical usage by comparing a plurality of voice data. Through the above, the model learning unit 131-4 may establish a language model (LM).

As another example, the model learning unit 131-4 may establish information ontology that may determine an executable operation based on a recognized user voice.

The model learning unit 131-4 may learn a data recognition model used for determining circumstances using the learning data. In this case, the data recognition model may be a pre-established model. For example, the data recognition model may be a model which is established in advance by receiving basic learning data (for example, sample voice data, etc.). As another example, the data recognition model may be an acoustic model (AM) or a language model (LM) which is established in advance using big data. The model learning unit 131-4 may learn the voice data of a specific user, and develop an AM or a LM which is speaker independent and pre-established into a personalized AM or LM.

The data recognition model may be established in consideration of the application field of the recognition model, the purpose of learning or computer performance of a device, etc. The data recognition model, for example, may be a model based on a Neural Network. For example, models such as Deep Neural Network (DNN), Recurrent Neural Network (RNN) and Bidirectional Recurrent Deep Neural Network (BRDNN) may be used as a data recognition model, but is not limited thereto.

According to one or more exemplary embodiments, if there are a plurality of pre-established data recognition models, the model learning unit 131-4 may determine a data recognition model with high relevancy between input learning data and basic learning data as a data recognition model to learn. In this case, the basic learning data may be pre-classified according to the type of data, and the data recognition model may be pre-established according to the type of data. For example, the basic learning data may be pre-classified by various criteria such as an area where the learning data is generated, a time at which the learning data is generated, a size of the learning data, a genre of the learning data, a creator of the learning data, a type of object in the learning data, etc.

In addition, the model learning unit 131-4, for example, may learn a data recognition model using a learning algorithm including an error back-propagation method or a gradient descent method, etc.

For example, the model learning unit 131-4 may learn a data recognition model through supervised learning using learning data as an input value. As another example, the model learning unit 131-4 may learn a data recognition model through unsupervised learning which finds criteria for determining circumstances by learning the type of data for determining circumstances without further guidance. As another example, the model learning unit 131-4 may learn a data recognition model through reinforcement learning which uses feedback on whether the result of the circumstances determination according to learning is correct.

Further, when the data recognition model is learned, the model learning unit 131-4 may store the learned data recognition model. In this case, the model learning unit 131-4 may store the learned data recognition model in the memory 160 of the electronic apparatus 100. Alternatively, the model learning unit 131-4 may store the learned data recognition model in the memory of the server 200 which is connected to the electronic apparatus 100 with wire or wirelessly.

In this case, the memory 160 where the learned data recognition model is stored may store commands or data associated with at least one other element of the electronic apparatus 100 together. In addition, the memory 160 may store software and/or programs. For example, the programs may include a kernel, a middleware, an application programming interface (API) and/or an application program (or "application"), etc.

The model evaluation unit 131-5 may input evaluation data to a data recognition model, and if the recognition result output from the evaluation data does not satisfy predetermined criteria, allow the model learning unit 131-4 to learn again. In this case, the evaluation data may be predetermined data for evaluating the data recognition model.

In the initial recognition model construction stage, the evaluation data may be voice data including phonemes with different physical characteristics. Subsequently, the evaluation data may be replaced by a voice data set of which degree of similarity gradually becomes consistent. Through the above, the model evaluation unit 131-5 may gradually verify the performance of the data recognition model.

For example, if the number or the ratio of the evaluation data whose recognition result is not accurate among the recognition results of the learned data recognition model for the evaluation data exceeds a predetermined threshold value, the model evaluation unit 131-5 may evaluate that predetermined criteria are not satisfied. For example, when the predetermined criteria are defined as a ratio of 2%, when the learned data recognition model outputs an incorrect recognition result for evaluation data exceeding 20 out of a total of 1000 evaluation data, the model evaluation unit 131-5 may evaluate that the learned data recognition model is not suitable.

On the other hand, when there are a plurality of learned data recognition models, the model evaluation unit 131-5 may evaluate whether each of the learned moving image recognition models satisfies the predetermined criteria and determine the model which satisfies the predetermined criteria as the final data recognition model. In this case, when there are a plurality of models satisfying the predetermined criteria, the model evaluating unit 131-5 may determine any one or a predetermined number of models previously set in descending order of the evaluation score as the final data recognition model.

At least one of the data acquisition unit 131-1, the preprocessing unit 131-2, the learning data selection unit 131-3, the model learning unit 131-4, and the model evaluation unit 131-1 in the data learning unit 131-5 may be manufactured in the form of a hardware chip and mounted on an electronic apparatus. For example, at least one of the data acquisition unit 131-1, the preprocessing unit 131-2, the learning data selection unit 131-3, the model learning unit 131-4, and the model evaluation unit 131-1 may be manufactured in the form of a hardware chip exclusively used for artificial intelligence (AI), in the form of the existing universal processor (for example, CPU or application processor), or as part of IP for a specific function to be mounted on the above-described various electronic apparatuses 100.

The data acquisition unit 131-1, the preprocessing unit 131-2, the learning data selection unit 131-3, the model learning unit 131-4, and the model evaluating unit 131-5 may be mounted on a single electronic apparatus or on separate electronic apparatuses, respectively. For example, some of the data acquisition unit 131-1, the preprocessing unit 131-2, the learning data selection unit 131-3, the model learning unit 131-4, and the model evaluation unit 131-5 may be included in the electronic apparatus 100, and the rest may be included in the server 200.

At least one of the data acquisition unit 131-1, the preprocessing unit 131-2, the learning data selection unit 131-3, the model learning unit 131-4, and the model evaluation unit 131-5 may be implemented as a software module. If at least one of the data acquisition unit 131-1, the preprocessing unit 131-2, the learning data selection unit 131-3, the model learning unit 131-4, and the model evaluation unit 131-5 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

Figure 4B:
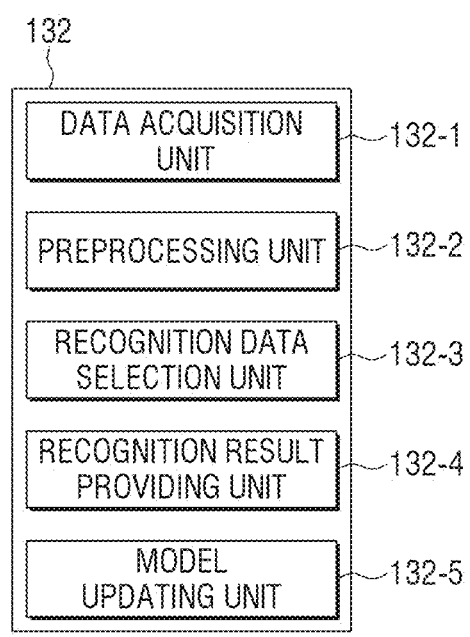
FIG. 4B is a block diagram illustrating a data recognition unit according to an exemplary embodiment.

FIG. 4B is a flowchart illustrating the data recognition unit 132 according to an exemplary embodiment. Referring to FIG. 4A, the data learning unit 132 according to an exemplary embodiment may include a data acquisition unit 132-1, a preprocessing unit 132-2, a recognition data selection unit 132-3, a recognition result providing unit 132-4, and a model updating unit 132-5.

The data acquisition unit 132-1 may acquire data to determine circumstances, and the preprocessing unit 132-2 may preprocess the acquired data so that the acquired data can be used to determine circumstances. The preprocessing unit 132-2 may process the acquired data into a predetermined format so that the recognition result providing unit 132-4, which will be described later, can utilize the data acquired to determine circumstances.

The recognition data selection unit 132-3 may select data to determine circumstances from the preprocessed data. The selected data may be provided to the recognition result providing unit 132-4. The recognition data selection unit 132-3 may select some or all of the preprocessed data according to predetermined criteria for determining circumstances. In addition, the recognition data selection unit 132-3 may select data according to the criteria predetermined by learning of the model learning unit 142-4 which will be described later.

The recognition result providing unit 132-4 may apply the selected data to the data recognition model to determine circumstances. The recognition result providing unit 132-4 may provide the recognition result according to the data recognition purpose. The recognition result providing unit 132-4 may apply the selected data to the data recognition model by using the data selected by the recognition data selection unit 132-3 as an input value. In addition, the recognition result may be determined by the data recognition model.

For example, the recognition result providing unit 132-4 may recognize a user utterance which has been input according to the classification criteria determined in the data recognition model. By using the recognized user voice and the information ontology, the processor 130 may determine what task the user intends to perform. As another example, the recognition result providing unit 132-4 may recognize a key word in the user utterance inputted using the data recognition model. Based on the recognized key word, the processor 130 may determine a candidate task. The processor 130 may then use the intelligent assistant to provide a sentence for the user to utter to perform the candidate task.

The model updating unit 132-5 can update the data recognition model based on the evaluation of the recognition result provided by the recognition result providing unit 132-4. For example, the model updating unit 132-5 may provide the model learning unit 131-4 with the recognition result provided by the recognition result providing unit 132-4 so that the model learning unit 131-4 can update the data recognition model.

At least one of the data acquisition unit 132-1, the preprocessing unit 132-2, the recognition data selection unit 132-3, the recognition result provision unit 132-4, and the model updating unit 132-5 in the data recognition unit 132 may be fabricated in the form of at least one hardware chip and mounted on an electronic apparatus. For example, at least one of the data acquisition unit 132-1, the preprocessing unit 132-2, the recognition data selection unit 132-3, the recognition result providing unit 132-4, and the model updating unit 132-5 may be manufactured in the form of a chip exclusively used for hardware for artificial intelligence (AI), in the form of the existing universal processor (for example, CPU or application processor), or as part of IP for a specific function to be mounted on the above-described various electronic apparatuses 100.

The data acquisition unit 132-1, the preprocessing unit 132-2, the recognition data selection unit 132-3, the recognition result providing unit 132-4, and the model updating unit 132-5 may be mounted on a single electronic apparatus or on separate electronic apparatuses, respectively. For example, some of the data acquisition unit 132-1, the preprocessing unit 132-2, the recognition data selection unit 132-3, the recognition result providing unit 132-4, and the model updating unit 132-5 may be included in the electronic apparatus 100 and the rest may be included in the server 200.

At least one of the data acquisition unit 132-1, the preprocessing unit 132-2, the recognition data selection unit 132-3, the recognition result providing unit 132-4, and the model updating unit 132-5 may be implemented as a software module. If at least one of the data acquisition unit 132-1, the preprocessing unit 132-2, the recognition data selection unit 132-3, the recognition result providing unit 132-4, and the model updating unit 132-5 is implemented as a software module (or a program module including instructions), the software module may be stored in a non-transitory computer readable recording medium. At least one software module may be provided by an operating system (OS) or a predetermined application. Alternatively, part of at least one software module may be provided by an OS, and the remaining part may be provided by a predetermined application.

Figure 5:
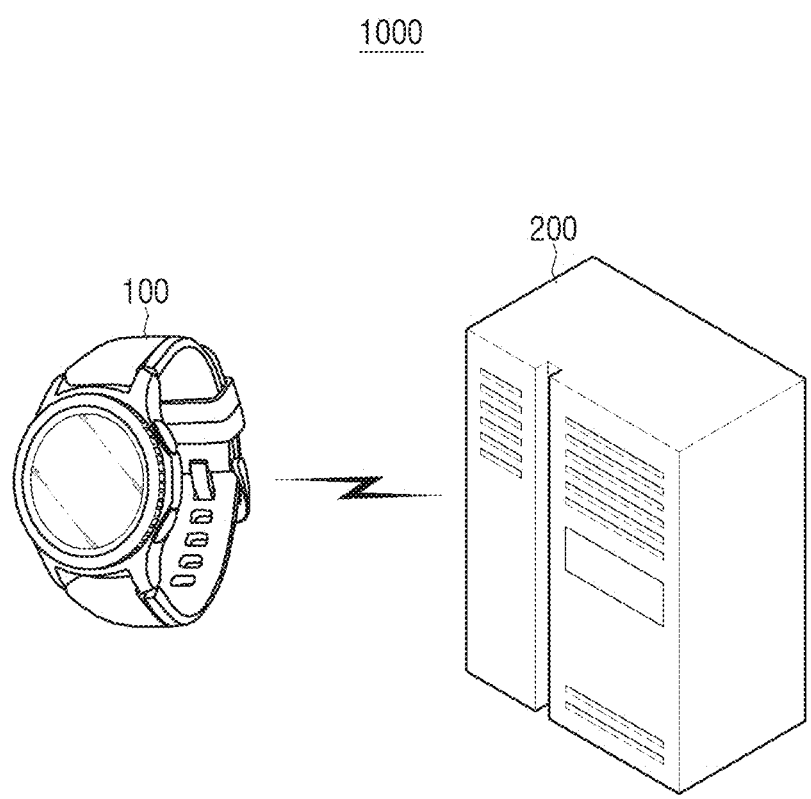
FIG. 5 is a schematic view illustrating an electronic apparatus system according to an exemplary embodiment.

FIG. 5 is a concept view illustrating an intelligent assistant system 1000 according to an exemplary embodiment. Referring to FIG. 5, the intelligent assistant system 1000 may include the electronic apparatus 100 and the server 200.

The electronic apparatus 100 may recognize a user voice which is uttered by a user and understand the language. The electronic apparatus 100 may provide a corresponding task based on the recognized user voice. If it is impossible to determine a corresponding task based on the recognized user voice, the electronic apparatus 100 may provide a guide for guiding a candidate task. The server 200 may provide information when the electronic apparatus 100 manages the conversation with the user and generates a response. In addition, the server 200 may provide or update the language model and information ontology used in the electronic apparatus 100. As such, the electronic apparatus 100 may provide an intelligent assistant service in association with the server 200.

As another example, the electronic apparatus 100 may simply be implemented as an input/output device that receives the user's voice and provides a guide, and the server 200 may be implemented to process most of the intelligent assistant services. As illustrated in FIG. 5, when the electronic apparatus 100 is implemented as a small wearable device such as a smart watch and the available resources are limited, the processes of determining a candidate task using the information ontology and generating a natural language may be performed by the server 200 which has rich resources.

Figure 6A:
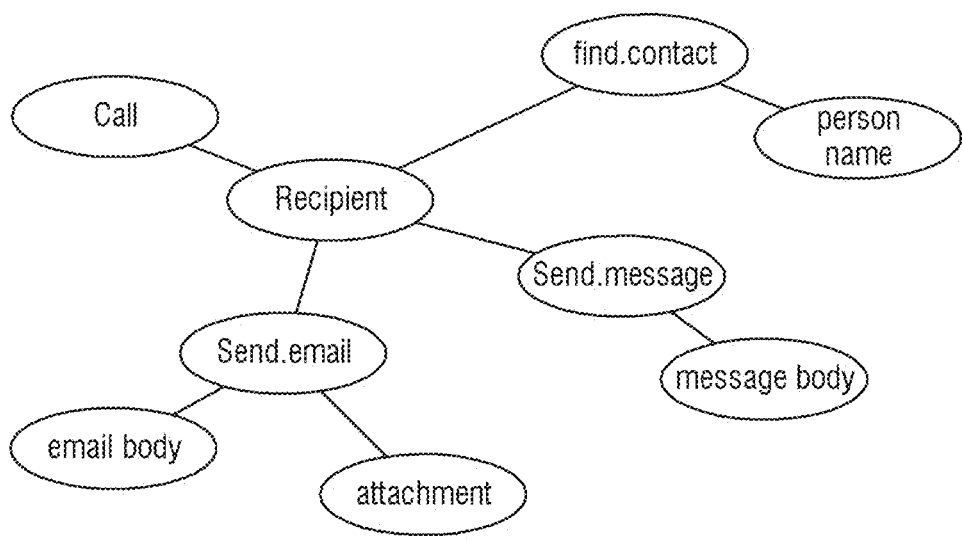
FIG. 6A is a schematic view illustrating an ontology according to an exemplary embodiment.

FIG. 6A is a concept view illustrating information ontology according to an exemplary embodiment. The processor 130 may determine whether it is possible to perform a task corresponding to the received user input. If it is determined that it is possible to perform the task, the processor 130 may determine a candidate task related to the received user input. According to an exemplary embodiment, it is the information ontology that is used to determine a candidate task. The information ontology is a network that represents the relationship between tasks and entities. In this sense, the information ontology may also be called a task network.

If it is determined that it is not possible to perform the task, the received user input may be an arrangement of a partial word or an incomplete sentence. The processor 130 may acquire the intention or parameter from the received user input. In addition, the processor 130 may determine an entity (or a key word) corresponding to the acquired intention or parameter. The processor 130 may determine the tasks associated with the object which is determined on the information ontology as candidate tasks.

In the example of FIG. 6A, the processor 130 may determine an entity, called a recipient, from the user input. The word 'recipient' is associated with tasks on the information ontology, such as finding a contact, sending a message, sending an email, and making a call.

Accordingly, the processor 130 may determine the four tasks, i.e., finding a contact, sending a message, sending an email, and making a call as candidate tasks. The processor 130 may provide a guide for guiding the candidate tasks.

As an example of sending a message which is one of the candidate tasks, the processor 130 may determine the entities connected to the candidate task on the information ontology. On the information ontology of FIG. 6A, the task of sending a message is connected to the recipient and the message body. For example, the processor 130 may provide a guide message, "The recipient is acknowledged. You can send a message to the recipient. Please tell me the contents of the message."

Figure 6B:
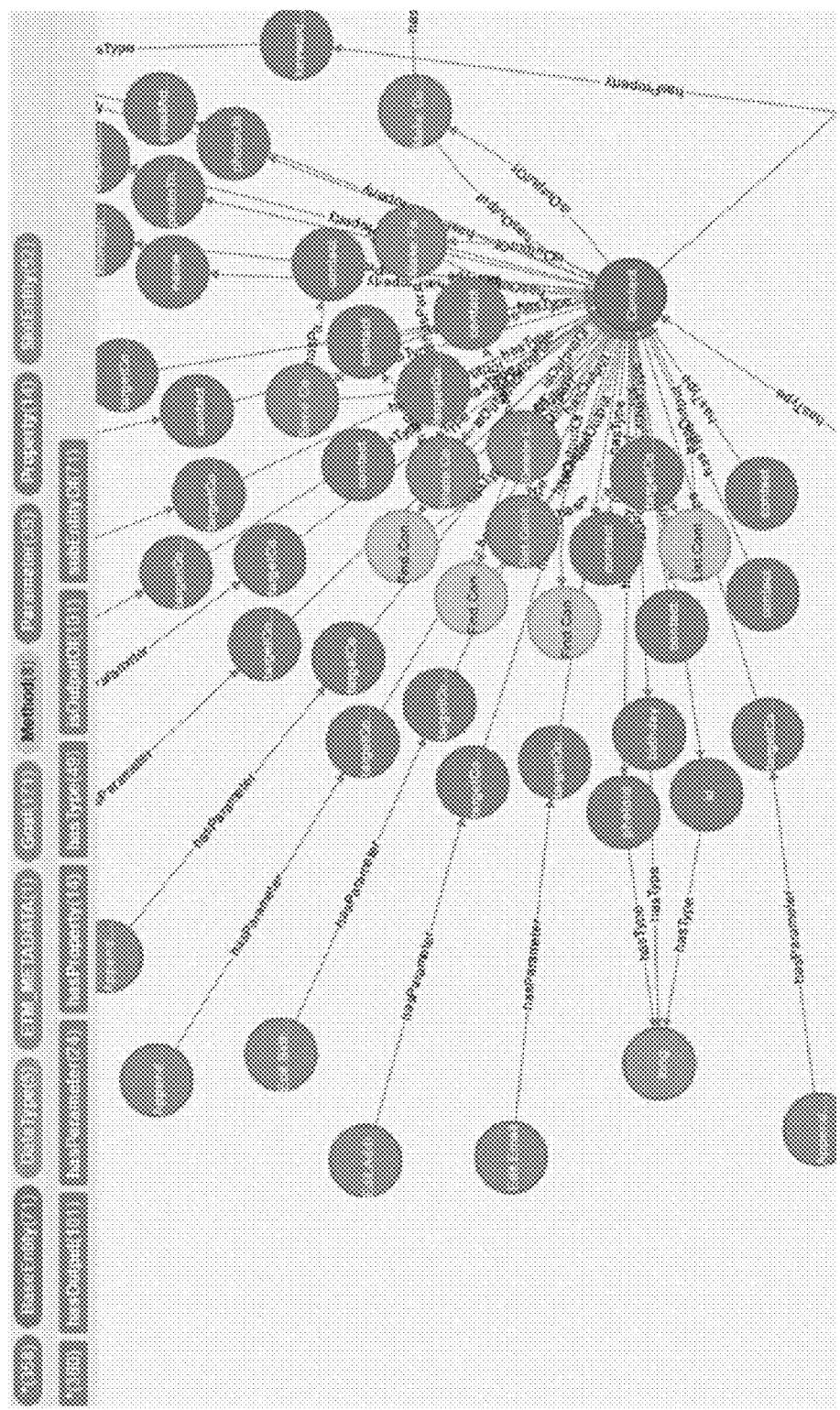
FIG. 6B is a view illustrating an example of an actual implementation of an ontology according to an exemplary embodiment.

FIG. 6B is a view illustrating an example in which the information ontology is actually implemented according to an exemplary embodiment. In FIG. 6B, a network configured around an entity called 'Contact' is shown. The relationship between each entity, the meaning or type of the entity, and the like are shown, and the information ontology allows the electronic apparatus 100 to understand the relationship between a user input and a candidate task.

Figure 7:
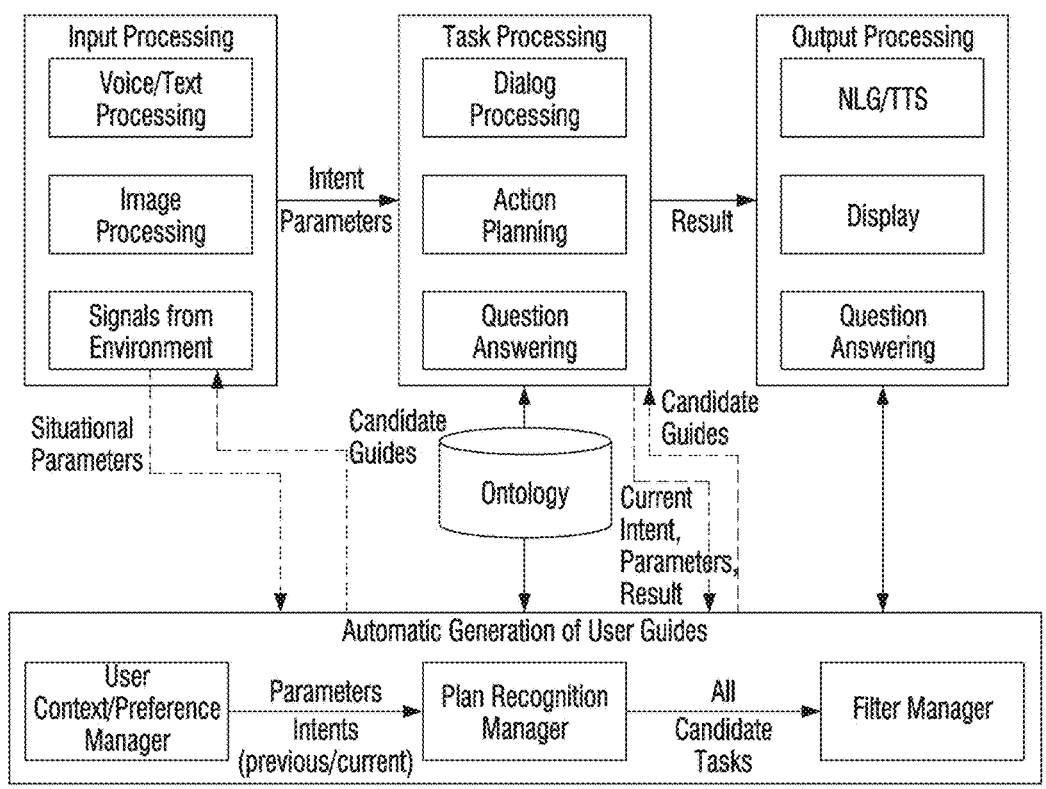
FIG. 7 is a view illustrating an architecture of an intelligent assistant providing a guide according to an exemplary embodiment.

FIG. 7 is a view illustrating an architecture of an intelligent assistant which provides the guide of the electronic apparatus 100 according to an exemplary embodiment.

First, the functions of a general intelligent assistant are performed through input processing, task processing, and output processing. In addition, the electronic apparatus 100 according to an exemplary embodiment may perform an Automatic Generation of User Guides process.

In the Input Processing, the electronic apparatus 100 may process various types of user input received. For example, the electronic apparatus 100 may acquire intention or a parameter by analyzing the received user input which is input as a voice or a text. In addition, the electronic apparatus 100 may acquire intention or a parameter even in a case in which a photo or an image is input.

Further, the electronic apparatus 100 may receive signals from a use environment. For example, the electronic apparatus 100 may receive and analyze information regarding an application which is currently executed in the electronic apparatus 100, information regarding a user's position, information regarding a current time, etc.

The electronic apparatus 100 may perform task processing using the user's intention and the parameter which is analyzed and integrated in the step of input processing. In the step of task processing, the electronic apparatus 100 may determine a task to be performed in the electronic apparatus through a dialog analysis, an action plan, a Q&A, etc. The information ontology may be used to determine the task to be performed.

The electronic apparatus 100 may perform an output processing using the execution result of the determined task. For example, the electronic apparatus 100 may provide an output that seems to talk to the user via natural language generation (NLG).

In a case in which it is determined that the electronic apparatus 100 can perform the corresponding task based on the user input that the electronic apparatus 100 receives, the intelligent assistant function may be provided to the user only by the input processing, the task processing, and the output processing described above.

However, if it is not possible to perform the corresponding task based on the received user input, the electronic apparatus 100 may additionally provide an Automatic Generation of User Guides process so that the user can easily learn the intelligent assistant functions.

For convenience of explanation, FIG. 7 illustrates that the automatic generation process of the user guide is composed of three modules. The electronic apparatus 100 may generate a guide for a candidate task using a user context/preference management module, a plan recognition management module, and a filter management module.

The user context/preference management module may build a personalized model using preferences (e.g., frequency) for tasks that were performed in the past. In addition, the user context/preference management module may track the use environment based on the status parameters received from the input processing process. For example, the context parameters may include an application which is currently executed, a parameter analyzed from the user input, and the like.

The plan recognition management module is a module for determining a candidate task to provide a guide. The plan recognition management module can determine an entity from the user input information received from the input processing and the task processing and determine the tasks connected to the determined entity in the information ontology. Also, the plan recognition management module may use the information received from the user context/preference management module for the candidate task.

The filter management module may determine a priority between candidate tasks or remove some candidate tasks based on the semantic relationship of the determined entity and the goal of each candidate task. The electronic apparatus 100 may then generate a guide for a predetermined number of candidate tasks (or remaining candidate tasks after some of the candidate tasks are removed) according to the priority.

As described above, the electronic apparatus 100 may generate and provide a guide on the basis of the analysis result of the user input. This is illustrated in FIG. 7 in which a guide for candidate tasks is provided in the process of task processing.

As another example, the electronic apparatus 100 may generate and provide a guide even when there is no user input. The electronic apparatus 100 may provide a guide for executable tasks to a user based on only the use environment information provided in the process of input processing, such as an application currently being executed. This is illustrated in FIG. 7 in which a guide for candidate tasks is provided in the process of input processing. Below, a method of providing a guide based on only the use environment information will be described in detail with reference to FIG. 8.

Figure 8:
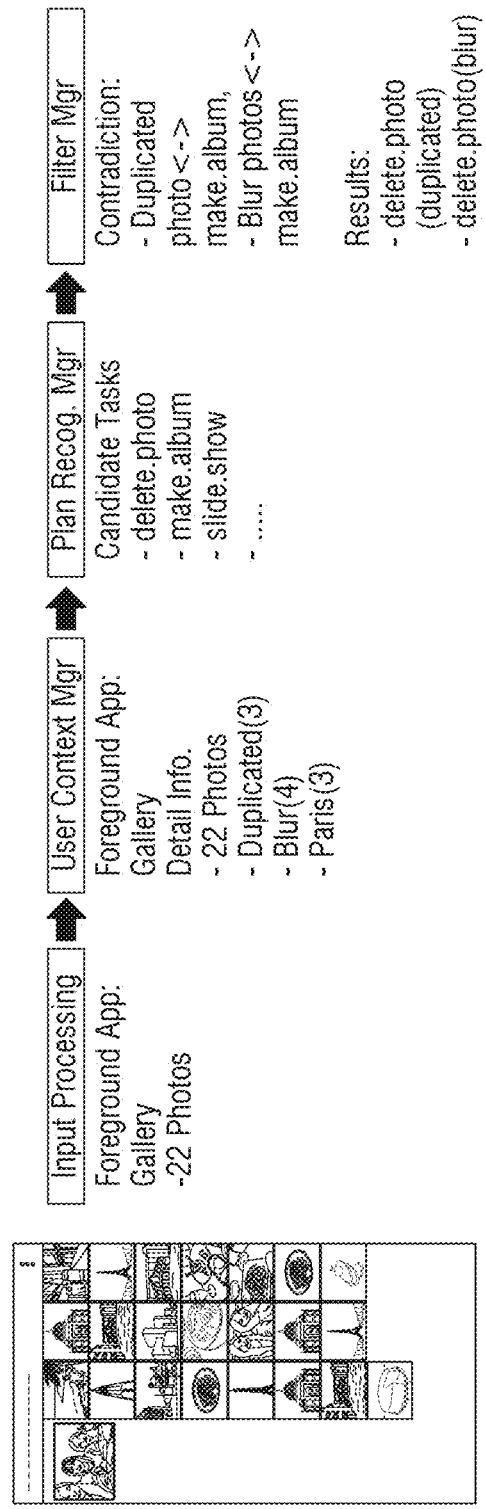
FIG. 8 is a view illustrating a candidate task determination process according to an exemplary embodiment.

Referring to FIG. 8, the electronic apparatus 100 may collect the use environment information that the currently executed application is a gallery application and currently has 22 photos.

Subsequently, the electronic apparatus 100 may determine the specific attributes of the 22 photos. In the example of FIG. 8, the electronic apparatus 100 may determine attributes information that three photos of the 22 photos are copied photos, four photos are out of focus, and three photos were taken in Paris.

The electronic apparatus 100 may determine candidate tasks which can be performed with the entity of photos using information ontology. For example, the electronic device 100 may determine three candidate tasks from the information ontology: 'delete photos', 'create album', and 'slide show'.

The electronic apparatus 100 may then use some semantic relationship between the attributes of the entity and the goals of the tasks and remove some candidate tasks. For example, the electronic apparatus 100 may determine that the entity attributes of the copied photos are not associated with the task goal of creating an album. In addition, the electronic apparatus 100 may determine that the entity attributes of being out of focus are not associated with the task goal of creating an album.

Then, the electronic apparatus 100 may determine that the attributes of copied photos and photos which are out of focus fit for the candidate task of removing photos. Accordingly, the electronic apparatus 100 may generate a guide for guiding a method for performing the candidate task of removing photos through the intelligent assistant function.

Figure 9:
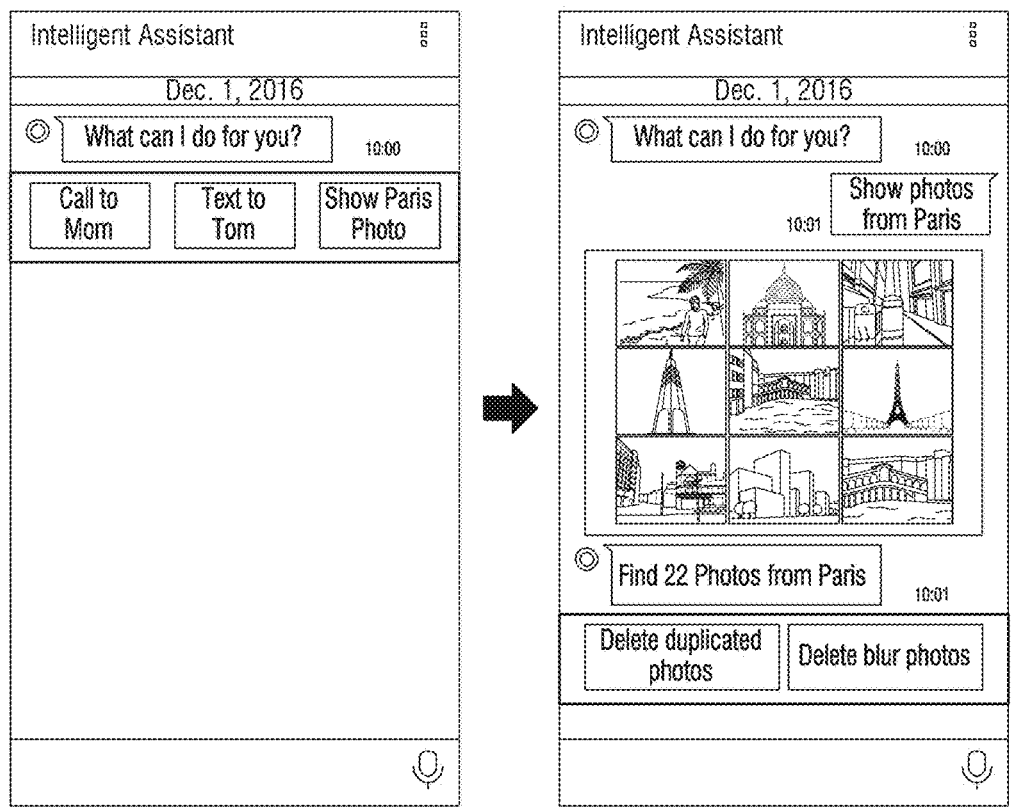
FIG. 9 is a view illustrating an example of a guide providing screen according to an exemplary embodiment.

FIG. 9 is a view illustrating an example of a guide providing screen according to an exemplary embodiment. When the intelligent assistant function is executed, a voice and/or a text that induces a user utterance such as "What can I do for you?" may be output. Using the task execution history information, the electronic apparatus 100 may determine a candidate task even before a user input is performed, and may provide a guide for executing the candidate task.

In the example of FIG. 9, the electronic apparatus 100 may provide a guide for a plurality of candidate tasks such as 'Call to mom', 'Text to Tom', and 'Show Paris photo' using the task execution history information. The sentences displayed in the respective guides correspond to sentences that the electronic apparatus 100 may determine and execute corresponding actions when they are uttered. As such, the electronic apparatus 100 may allow the user to learn an input method for performing a task naturally through the intelligent assistant.

Subsequently, when a voice input of "Show Paris photo" is received from the user, the electronic apparatus 100 may determine that the corresponding task is executable. Then, the electronic apparatus 100 may display a photo taken in Paris by executing a gallery application which is a corresponding task. The electronic apparatus 100 may then determine the attributes of displayed photos and guide the candidate tasks again.

According to the above-described exemplary embodiments, the electronic apparatus 100 may determine a candidate task even when a user input that causes an error is received in the intelligent assistant service or even when there is no user input, and generate and provide a guide for the determined candidate task. Through the above, the user may learn how to use an intelligent assistant service naturally.

Figure 10:
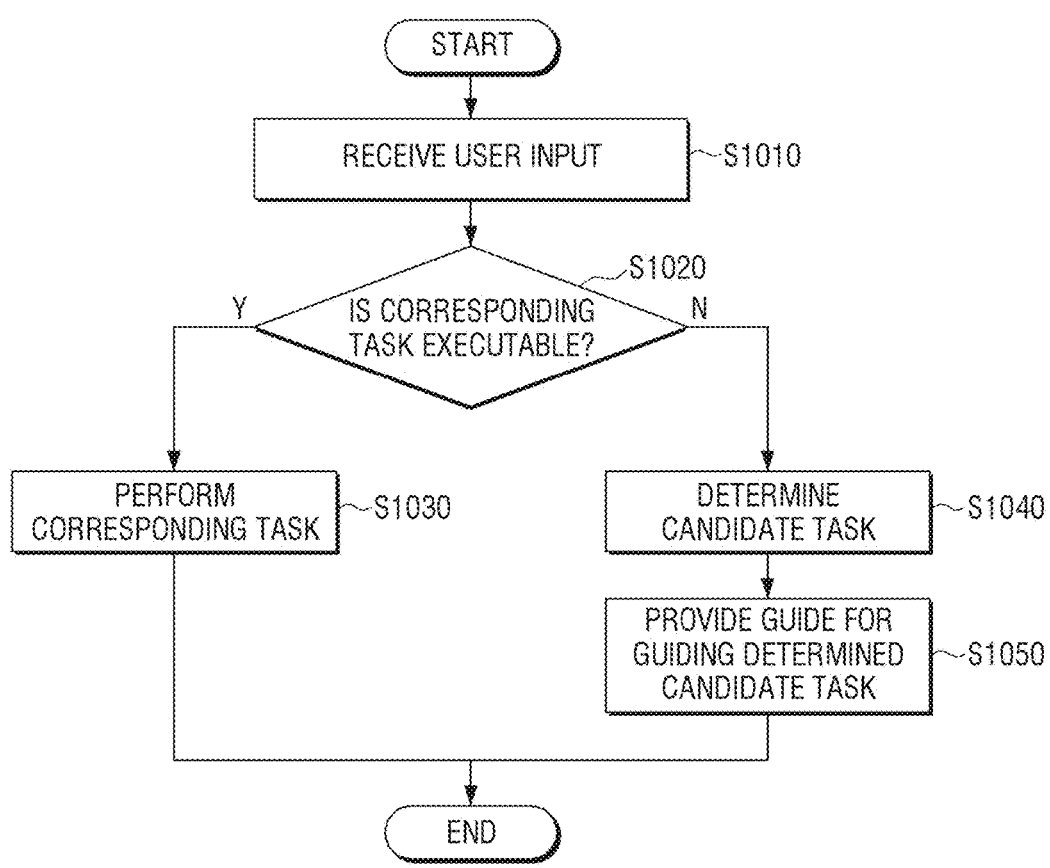
FIG. 10 is a flowchart illustrating a guide providing method of an electronic apparatus according to an exemplary embodiment.

FIG. 10 is a flowchart illustrating a guide providing method of an electronic apparatus according to an exemplary embodiment. Referring to FIG. 10, the electronic apparatus 100 may receive a user input (S1010).

In addition, the electronic apparatus 100 may determine whether it is possible to perform a task corresponding to the received user input (S1020). For example, the electronic apparatus 100 may acquire intention or a parameter by analyzing the received user input. Based on the obtained intention and parameter, the electronic apparatus 100 may determine whether there is a task that can be performed. As another example, the electronic apparatus 100 may determine whether a word corresponding to a task execution command is included by analyzing the received user input. If a word corresponding to a task execution command (or a system command) is included, the electronic apparatus 100 may determine that it is possible to perform the task corresponding to the received user input.

If it is determined that performing the task is possible (S1020-Y), the electronic apparatus 100 may perform the corresponding task immediately without generating a guide (S1030).

On the contrary, if it is determined that performing the task is not possible (S1020-N), the electronic apparatus 100 may determine a candidate task related to the received user input (S1040). For example, the electronic apparatus 100 may acquire intention or a parameter from the received user input. Based on the obtained intention and parameter, the electronic apparatus 100 may determine an entity. The electronic apparatus 100 may determine candidate tasks connected to the entity using information ontology. In addition, the electronic apparatus 100 may filter some of the candidate tasks from among all candidate tasks. From a semantic relationship between an attribute of an entity and a task goal, the electronic apparatus 100 may determine a candidate task to be removed.

As another example, the electronic apparatus 100 may determine the candidate tasks using the information of the currently used application, the task execution history information, the location of the user, and the use environment information such as the current time.

Subsequently, the electronic apparatus 100 may provide a guide for guiding the determined candidate tasks (S1050). The electronic apparatus 100 may provide an interactive guide using a natural language generation model. For example, the electronic apparatus 100 may provide as a guide a sentence that the user has to utter, in order to perform the determined candidate tasks through the intelligent assistant service.

The methods according to one or more exemplary embodiments may be implemented as a program command type that may be performed through various computer units and may be recorded in a computer readable medium. The computer-readable medium may include a program command, a data file, a data structure or the like, alone or a combination thereof. The program commands recorded in the computer-readable medium may be designed for exemplary embodiments or may be known to those skilled in a field of computer software. Examples of the computer-readable media include magnetic media such as hard disks, floppy disks, and magnetic tape; optical media such as CD-ROMs and DVDs; magnetic media such as floppy disks; Magneto-optical media, and hardware devices specifically configured to store and execute program instructions such as ROM, RAM, flash memory, and the like. The program commands may include not only machine codes which are made by a compiler, but also high-level language code which can be executed via computer by using interpreter. The hardware device may be configured to operate as one or more software modules. Conversely, software modules may be configured to operate as a hardware device.

Although exemplary embodiments have been shown and described, it will be appreciated by those skilled in the art that changes may be made to the exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. An electronic apparatus, comprising:
   an input interface configured to receive a user input;
   a display configured to display a guide; and
   a processor configured to:
      based on a task matching to the received user input being not performable in the electronic apparatus, search at least one candidate task which is different from the matching task and related to the received user input based on information representing a relationship between a candidate task and an entity regarding the matching task,
      obtain information regarding a use environment of the electronic apparatus,
      identify a candidate task corresponding to the obtained information from among the at least one searched candidate task, and
      control the display to provide a guide for guiding the identified candidate task.

2. The electronic apparatus as claimed in claim 1, wherein the processor is further configured to obtain at least one from among an intention and a parameter by analyzing the received user input and identify whether a task matched to the received user input is included in tasks which are performable in the electronic apparatus, based on the obtained at least one from among the intention and the parameter.

3. The electronic apparatus as claimed in claim 1, wherein the processor is further configured to identify whether the task is performable according to whether a word corresponding to a task execution command is included by analyzing the received user input.

4. The electronic apparatus as claimed in claim 1, wherein the processor is further configured to obtain at least one from among an intention and a parameter by analyzing the received user input, obtain an entity corresponding to the obtained at least one from among the intention and the parameter, and search an information for a candidate task based on the obtained entity.

5. The electronic apparatus as claimed in claim 1, wherein the processor is further configured to remove part of the at least one searched candidate task based on a purpose of a task and an attribute of the entity.

6. The electronic apparatus as claimed in claim 5, wherein the information regarding the use environment comprises at least one from among information regarding an application being currently executed in the electronic apparatus, information regarding a task execution history, information regarding a user's position, and information regarding a current time.

7. The electronic apparatus as claimed in claim 1, wherein the processor is further configured to control the display to display a sentence for a user to utter to perform the identified candidate task.

8. A guide providing method of an electronic apparatus, comprising:
   receiving a user input;
   based on a task matching to the received user input being not performable in the electronic apparatus, searching at least one candidate task which is different from the matching task and related to the received user input based on information representing a relationship between a task and an entity regarding the matching task;
   obtaining information regarding a use environment of the electronic apparatus;
   identifying a candidate task corresponding to the obtained information from among the at least one searched candidate task; and
   providing a guide for guiding the identified candidate task.

9. The method as claimed in claim 8, further comprising:
   obtaining at least one from among an intention and a parameter by analyzing the received user input; and
   identifying whether a task matched to the received user input is included in tasks which are performable in the electronic apparatus, based on the obtained at least one from among the intention and the parameter.

10. The method as claimed in claim 8, further comprising identifying whether the task is performable according to whether a word corresponding to a task execution command is included by analyzing the received user input.

11. The method as claimed in claim 8, further comprising:
    obtaining at least one from among an intention and a parameter by analyzing the received user input;
    identifying an entity corresponding to the obtained at least one from among the intention and the parameter, and searching an information for a candidate task based on the identified entity.

12. The method as claimed in claim 8, further comprising:
    removing part of the at least one searched candidate task based on a purpose of a task and an attribute of the entity.

13. The method as claimed in claim 8, wherein the information regarding the use environment comprises at least one from among information regarding an application being currently executed in the electronic apparatus, information regarding a task execution history, information regarding a user's position, and information regarding a current time.

14. The method as claimed in claim 8, wherein the providing a guide comprises providing a sentence for a user to utter to perform the identified candidate task.

15. A non-transitory computer readable recording medium including a program for executing a guide providing method of an electronic apparatus, wherein the guide providing method comprises:
    receiving a user input;
    based on a task matching to the received user input being not performable in the electronic apparatus, searching at least one candidate task which is different from the matching task and related to the received user input based on information representing a relationship between a task and an entity regarding the matching task;
    obtaining information regarding a use environment of the electronic apparatus;
    identifying a candidate task corresponding to the obtained information from among the at least one searched candidate task; and
    providing a guide for guiding the identified candidate task.

16. An intelligent secretary electronic apparatus using a neural network model, the apparatus comprising:
    an input interface configured to receive a user input;
    a display; and
    a processor configured to:
      based on an operation matching to the received user input being not performable in the electronic apparatus, search at least one candidate operation which is different from the matching operation and associated with the received user input based on information representing a relationship between a candidate operation and an entity regarding the matching operation,
      obtain information regarding a use environment of the electronic apparatus,
      identify a candidate operation corresponding to the obtained information from among the at least one searched candidate operation, and
      control the display to provide a guide that guides the identified candidate operation.

17. The intelligent secretary electronic apparatus as claimed in claim 16, wherein the user input is a user voice, and
    wherein the processor is configured to perform a voice recognition with respect to the user voice by using an artificial intelligence neural network.

18. The intelligent secretary electronic apparatus as claimed in claim 16, wherein the processor is configured to obtain at least one from among an intention and a parameter by analyzing the received user input, identify an entity corresponding to the obtained intention and parameter, and search a candidate operation in an information based on the identified entity.

* * * * *